Feb. 24, 1959  K. GEBELE  2,874,622
PHOTOGRAPHIC CAMERA CONSTRUCTION
Filed Sept. 26, 1955  2 Sheets-Sheet 1
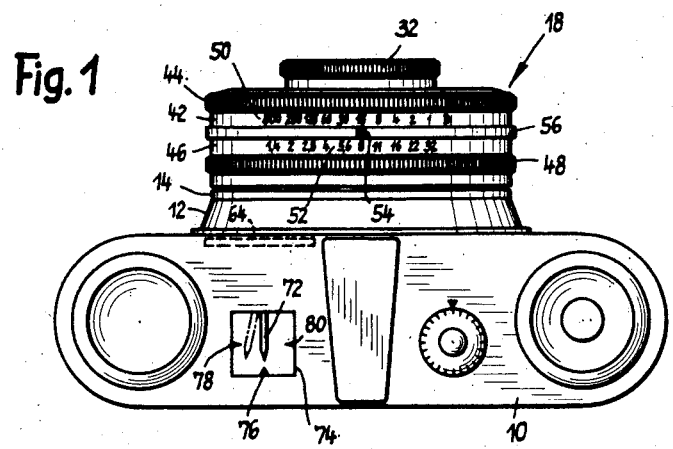
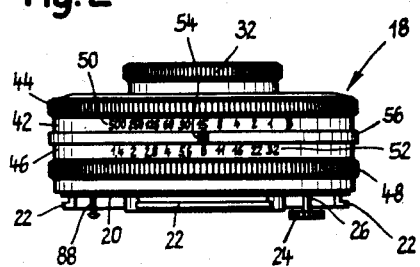
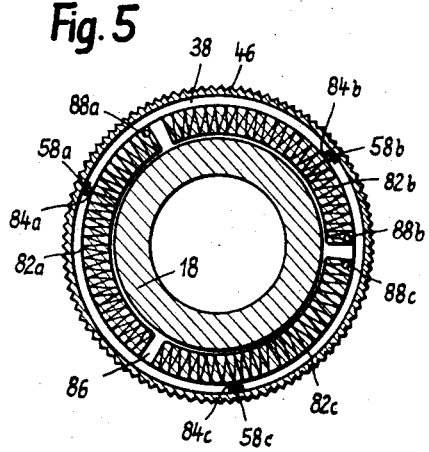
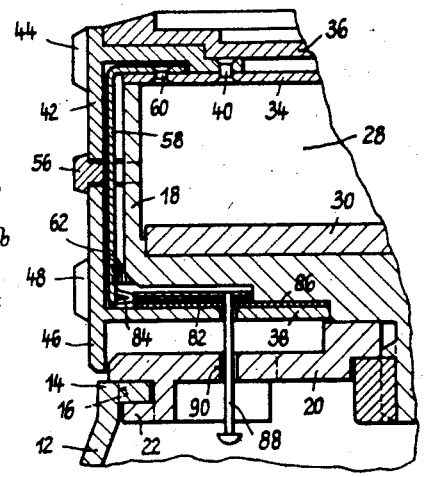

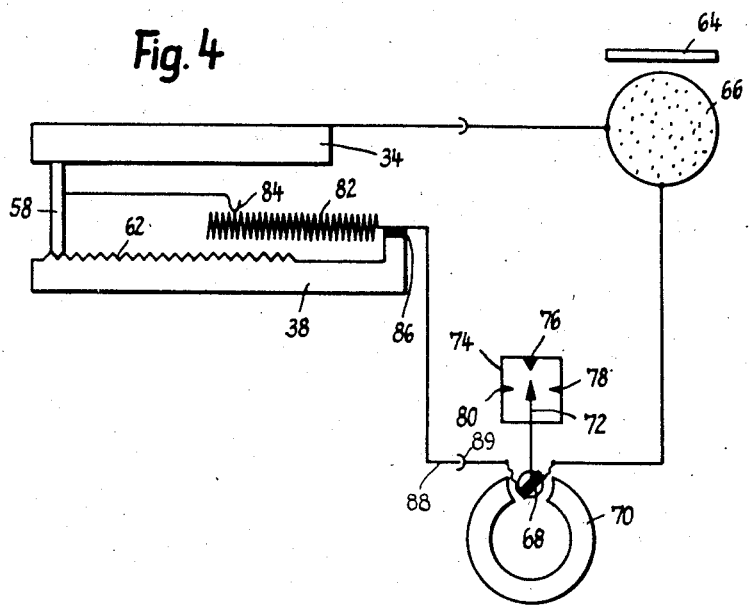
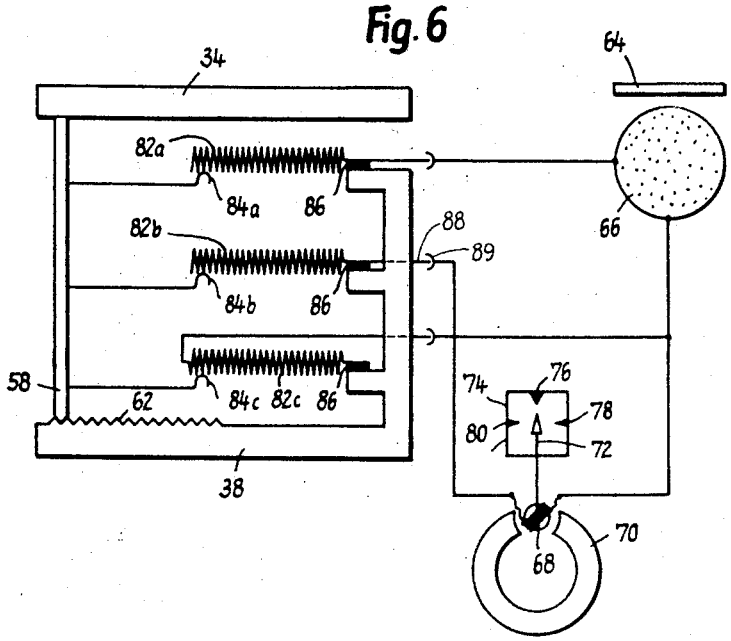

United States Patent Office 2,874,622
Patented Feb. 24, 1959

2,874,622

PHOTOGRAPHIC CAMERA CONSTRUCTION

Kurt Gebele, Munich, Germany, assignor to Hans Deckel, Munich, Germany, and Friedrich Wilhelm Deckel, Zug, Switzerland Application September 26, 1955, Serial No. 536,583

Claims priority, application Germany October 1, 1954

2 Claims. (Cl. 95—10)

This invention relates to a photographic camera provided with means to aid the quick setting of the exposure in accordance with prevailing light conditions.

An object of the invention is the provision of a generally improved and more satisfactory camera of this kind.

Another object is the provision of a camera having a shutter speed adjusting member and a diaphragm aperture adjusting member electrically connected to a built-in light meter in such manner that the relative adjustment of the shutter speed and diaphragm aperture affects the electrical circuit of the light meter.

Still another object is the provision of an improved construction in which one of the two adjusting members (for shutter speed and diaphragm aperture) may be moved to bring the light meter indication to a predetermined value, and then both of the adjusting members may be moved together, while maintaining the relative position between them but changing both shutter speed and diaphragm aperture in a complementary manner, while maintaining the light meter indicator at the predetermined optimum point.

A further object is the provision of a camera construction having a built-in light meter and having the diaphragm aperture adjustment and shutter speed adjustment electrically connected to the light meter, in which both of these adjustments may be moved together in a single direction to select various different possible combinations of shutter speed and diaphragm aperture, while maintaining the correct light value or exposure value.

These and other desirable objects may be attained in the manner disclosed as illustrative embodiment of the invention in the following description and in the accompanying drawings forming a part hereof, in which:

Fig. 1 is a top plan view of a camera in accordance with a preferred embodiment of the invention, with a detachable shutter in accordance with the invention mounted on the camera;

Fig. 2 is a top plan view of the shutter itself, detached from the camera;

Fig. 3 is a fragmentary axial section taken radially through part of the shutter and a portion of the camera, on a larger scale;

Fig. 4 is a wiring diagram of the electric circuit according to one form of the invention;

Fig. 5 is a transverse section through certain of the electrical parts of the shutter according to a second form of the invention; and Fig. 6 is a diagrammatic view similar to Fig. 4, illustrating the second form of the invention.

The same reference numerals throughout the several views indicate the same parts.

In Fig. 1 there is shown a photographic camera 10 which, except for the various features mentioned below, may be of any suitable known construction. Secured to the front of the camera in encircling relation to the optical axis is a frusto-conical tube or ring 12, terminating at its front edge in a bayonet ring or flange 14 having bayonet slots 16 of the usual kind.

The shutter, indicated in general at 18, carries at its rear a bayonet plate 20 provided with bayonet projections 22 which may be inserted axially through the bayonet slots 16 in the ring 14. When the shutter is rotated in a clockwise direction (when viewed from the front) through part of a revolution, after engaging the bayonet ring 20 properly with the bayonet ring 14, the shutter becomes firmly fastened to the camera in the known manner customary with bayonet mountings as commonly used on photographic apparatus.

The shutter comprises a housing or casing of the usual annular form, with shutter blades which move to open and close the central aperture or exposure aperture of the shutter, and with shutter operating mechanism and timing mechanism arranged as usual in the annular space within the shutter casing, around the central lens tube. It is also provided with iris diaphragm leaves or blades which may be adjusted to vary the size of the diaphragm aperture or stop. The details of construction of the shutter blades, the operating and timing mechanism, and the diaphragm leaves are not important for purposes of the present invention, and any suitable known construction may be used, as for example the shutter construction disclosed in the copending United States patent application of Kurt Gebele, Serial No. 509,929, filed May 20, 1955. The operative connection between the parts within the shutter casing and the operating or controlling parts mounted on the camera body may be effected through a shaft 26 mounted in the shutter, arranged parallel to the optical axis, and extending out through the back wall of the shutter and into the camera body (when the shutter is mounted in normal position on the camera, of course) where this shaft is provided with a pinion 24 meshing with suitable gearing within the camera body to control the rotary movements of the shaft and thereby to control or effectuate the necessary operation of the shutter. Again the specific details of the way in which this shaft is operated by parts within the camera body are not important for purposes of the present invention, and any suitable operating mechanism may be employed. For example, the operating mechanism may be substantially as shown in the copending United States patent application of Kurt Gebele, Serial No. 514, 218, filed June 9, 1955, the shaft 26 and pinion 24 of the present application corresponding substantially to the shaft 20 and pinion 200 in said copending application just mentioned. By turning the shaft 26 in one direction the shutter is tensioned or cocked ready for an exposure, and by turning it in the opposite direction the shutter is triggered or tripped to make an exposure. The annular space which contains the shutter operating mechanism is indicated at 28 in Fig. 3, the mechanism being mounted at least partly on the base plate 30. The lens, or at least one part thereof, is held by the lens mount 32 secured to the usual central lens tube of the shutter.

Rotatable on the front of the shutter housing or casing, about the optical axis as a center of rotation, is the shutter speed setting or adjusting member 34 having a bearing, for example, on the lens tube and maintained against forward axial displacement by the front cover plate 36 which in turn is stationarily fastened to the lens tube or to the base plate 30, for example by studs or other connecting members (not shown). The diaphragm leaves are controlled by means of a diaphragm setting or adjusting member 38 rotatably supported on the rear of the shutter housing 18.

An outer and readily accessible shutter speed setting member or ring 42, surrounding the shutter housing 18 at the front of the shutter, is fastened as by means of screws or rivets 40 to the inner shutter setting member 34 and is provided with a circumferentially extending and radially projecting rim 44 at its forward edge, knurled for easy grasping. Another external setting ring 46, circumferentially surrounding the rear part of the shutter housing behind the ring 42, is appropriately connected to or formed integrally with the diaphragm adjusting member 38. This ring 46 also has a circumferentially extending and radially projecting rim or ridge 48 which is knurled for easy grasping.

The speed setting ring 42 and the diaphragm setting ring 46 are so connected (in known manner) to the respective speed controlling mechanism within the shutter casing, and diaphragm leaves, that movement of both adjusting rings in the same direction will alter the shutter speed and the diaphragm aperture in a complementary manner. For example, if a given angular movement of the ring 42 in one direction serves to increase the exposure time to double its former value, the same amount of angular movement of the ring 46 in the same direction will serve to decrease the diaphragm aperture or stop to an extent just sufficient to compensate for the doubling of the exposure time, and vice versa. A shutter speed scale 50 is marked on a smooth part of the periphery of the ring 42, and a diaphragm aperture scale 52 (graduated in terms of the usual f numbers) is marked on a smooth part of the periphery of the setting ring 46, both scales being read in conjunction with a single stationary pointer or index mark 54 provided on a stationary ring 56 which is connected with the shutter housing 18 and which lies between the rings 42 and 46.

There is a detachable coupling, preferably of the frictional or resilient type, between the shutter speed setting members 34, 42 and the diaphragm aperture setting members 38, 46, so that when either one of these members is turned, the other will normally turn with it, to maintain the same relative position, but the two adjusting members may be shifted to different relative positions of orientation with respect to each other, by holding one and turning the other with sufficient force to overcome the frictional or resilient coupling. Conveniently the coupling is formed by a resilient coupling tongue 58 secured to the member 34 by rivets 60 and extending in an axial direction in an annular space between the shutter housing wall 18 and the members 42 and 46, to a position engaging a notched or serrated part 62 extending circumferentially along part of the inner face of the ring 46. An arcuate peripheral slot is formed in the stationary ring 56, of sufficient length to accommodate the maximum range of travel of the resilient arm 58. Due to its resilience, the arm 58 will tend to remain engaged with any one of the notches 62 in which it happens to be seated, so that rotary movement of the ring 42 will be transmitted to the ring 46, and vice versa; but if, for example, the ring 46 is forcibly held stationary and the ring 42 is turned, the relative turning force will cause the resilient arm 58 to spring out of the notch or recess in which it was previously seated, and enter another notch when the parts come to rest.

The camera 10 is provided with a built-in photoelectric exposure meter, of known type and operation, so that its structural elements and their arrangement in the camera need not be further described. It is sufficient for present purposes to say that the camera body is provided with a forwardly directed window, indicated diagrammatically at 64 in Figs. 1 and 4, in the front wall of the camera housing through which light from the object to be photographed passes to the photoelectric cell 66 (Fig. 4) which supplies an electric current varying in accordance with the varying intensity of light, in known manner. In the electrical circuit of this photoelectric cell, indicated diagrammatically in Fig. 4, there is the usual moving coil 68 rotatable in the magnetic field of a magnet 70 and carrying a pointer or hand 72 visible through a window 74 in the top wall of the camera body. According to the present invention, it is not necessary to provide a graduated scale in conjunction with the pointer 72, and it is sufficient to provide the much simpler and more easily operated arrangement of merely a "correct" reference point or pointer 76 in stationary position, in conjunction with two directional pointers 78 and 80, the purpose of which will be explained below.

The light meter circuit also includes a variable resistance controlled by the relative positions of adjustment or orientation of the shutter speed setting member 42 and diaphragm aperture setting member 46 with respect to each other. The variable resistance 82 is, for example, mounted on the diaphragm aperture adjusting part 38, 46 to move bodily therewith, the effective resistance being varied by means of a slider 84 which is mounted on and moves bodily with the shutter speed adjusting parts 34, 42, and which slides along and makes electrical contact with the resistance element 82 at various different positions along the length of the latter, depending upon the relative orientation of the shutter speed setting member 42 on the diaphragm aperture setting member 46. Conveniently the slider 84 may be mounted on or formed as a part or extension of the resilient arm 58.

One side of the electrical circuit, for example the side between the slider 84 and the photoelectric cell 66, may be constituted by ground, that is, by the various metal parts of the shutter assembly and the camera housing. The other side of the electrical circuit, from the variable resistance 82 to the photoelectric cell 66, is insulated from the grounded part, so that the resistance of the circuit will be truly responsive to changes in relative position of the parts 42 and 46. For example, the variable resistance element 82 may be mounted on an insulating member 86 interposed between it and the member 38, and the electrical connection may be carried from the resistance element 82 through a conducting post 88 spaced from the grounded metal casing of the shutter and extending through various slots or insulated bushings to a position where the rear end of the rod 88 may engage with a suitable arcuate contact member mounted on the camera body and making contact with the member 88 in all adjusted positions of the latter. An arcuate slot 90 in the bayonet plate 20 provides for non-contacting passage of the post 88.

In Fig. 4, the contact post 88 is indicated diagrammatically, and the fixed contact member on the camera body, over which the post 88 slides in all positions of adjustment of the ring 38, is indicated diagrammatically at 89.

In this embodiment of the invention, the parts operate as follows: First, the camera is pointed toward the object to be photographed, so that light from such object enters the window 64 and falls upon the photocell 66. The pointer 72 of the light meter then experiences a deflection corresponding to the given light conditions, a typical deflected position being shown in dotted lines in Fig. 1. It is not necessary to read any scale in connection with the deflection of the pointer 72, but all that is required is to manipulate the adjusting rings 42 and 46 to change their relative position of orientation to a sufficient extent to bring the pointer 72 back to the "correct" position indicated by the reference mark 76.

This is done by varying the value of the electrical resistance 82, by turning the members 42 and 46 relative to each other. Preferably the rear or diaphragm adjusting ring 46 is held stationary by grasping the knurled rib 48 thereof, and the speed setting ring 42 is turned by manual turning force applied to the knurled rib 44 thereof, until the pointer or needle 72 lies opposite the "correct" mark or index 76. The electrical circuit is so designed that the pointers 78 and 80 indicate the directions in which the speed adjusting ring 42 must be turned in order to bring the pointer from a laterally deflected position back to the correct central position. In other words, if the needle 72 happens to be deflected to the left, close to the pointer 78 (as seen in dotted lines in Fig. 1) this indicates that the speed setting ring 42 is to be turned to the right, which is the direction in which the mark or arrow 78 points. If, on the other hand, the needle 72 is deflected to the right of the central position and lies close to the other pointer or arrow 80, which points leftwardly, this indicates that the speed setting ring 42 should be turned to the left, in the direction in which the arrow 80 points, in order to bring the needle 72 back to its correct central position.

Thus the mechanism is very simple and easy to use, as the operator merely needs to hold the rear ring 46 in a stationary position and turn the front ring 42 in whichever direction is indicated by the arrow or directional mark 78 or 80, as the case may be, which is nearest to the deflected position of the pointer 72. When the needle 72 has, by this adjustment, been brought to the correct central position, the operator may then release the holding grip on the rear ring 46 and may thereafter turn the rings 42 and 46 together (which is easily done because of the frictional or resilient coupling provided by the member 58) in one direction or the other, to adjust for any desired shutter speed and automatically for its correct corresponding diaphragm aperture, or to adjust for any desired diaphragm aperture, automatically adjusting the shutter speed accordingly.

In the typical example indicated in Figs. 1 and 2, the shutter is set for a speed of 15 (meaning, of course 1/15 of a second) and the diaphragm is set for $f:8$. However, the ring 42 may be turned to any other desired shutter speed (the aperture adjustment moving with it, on account of the coupling) without disturbing the integrated exposure value or light value setting. For instance, the ring 42 may be turned to a fast shutter speed of 1/500 of a second, which in this instance brings the diaphragm to an aperture of $f:1.4$, or may be turned to a speed of 1/2 second, bring the aperture to $f:22$. So long as the rings 42 and 46 move simultaneously, the electrical value of the resistance 82 is unchanged and the needle or pointer 72 experiences no further deflection. When the operator has set the mechanism for the selected shutter speed and its corresponding diaphragm aperture (or vice versa) the picture is taken in the usual manner.

It is seen that with this arrangement, a proper setting of relative values of shutter speed and diaphragm aperture, in accordance with prevailing light conditions, is possible in a very quick and easy manner, by a totally inexperienced person, simply by holding one of the two adjusting members (for shutter speed and for diaphragm aperture) and moving the other one in the direction indicated by that one of the two arrows or pointers 78 and 80 which is closest to the deflected position of the needle 72. When the relative values of speed and aperture have thus been correctly set in this easy manner, it is thereafter possible to adjust the mechanism to any desired pair of properly correlated absolute values of speed and aperture, by turning the two adjusting members together in one direction, which in fact is accomplished by turning force applied manually to only one of the adjusting members, since the other adjusting member is automatically carried along with it, due to the resilient or frictional coupling. Thus a mechanism has been provided which is efficient and satisfactory for use even by very experienced photographers who are well aware of all of the factors involved, yet simple enough to be usable easily and quickly also by the amateur with little or no previous knowledge of properly estimating light values or exposure values, or of properly correlating shutter speeds with diaphragm aperture size.

When the photocell 66 is of the barrier layer type, it is advisable to have a constant resistance present in the circuit, since in this way the deflection characteristics of the needle 72 are more favorable, and if a graduated scale is desired in conjunction with the needle 72, this graduated scale can be given a more favorable form. The use of a constant resistance is particularly important in the case of replaceable or interchangeable lenses, since in this case there is the additional problem of being able to fit lenses of different origins to an already existing camera having a built-in photoelectric cell and a built-in indicating instrument. For these reasons, it is advantageous to develop the resistance as an attenuating member with constant characteristic impedance, so that both from the standpoint of the photoelectric cell and from the standpoint of the measuring instrument or galvanometer, the resistance has a constant value.

For this purpose, the resistance 82 which was provided in the first embodiment of the invention, is now subdivided, according to the second embodiment, into three individual resistances 82a, 82b, and 82c, and three separate sliders are provided, 84a, 84b, and 84c, moving respectively over the three resistances the parts being electrically connected in such fashion that when the parts move relatively to each other in one direction, two of the resistances are increased and the third is decreased. The wiring diagram of this embodiment is shown in Fig. 6, while constructional details thereof are indicated in Fig. 5. It is seen that the two resistances 82a and 82b are arranged electrically in series with each other, in the main series circuit which goes through both the photoelectric cell 66 and the galvanometer coil 68. Both of these resistances 82a and 82b increase or decrease at the same time. The third resistance 82c is in a shunt circuit which bridges across the main circuit between the photoelectric cell and the galvanometer coil, and this third resistance increases when the others decrease, or decreases when the others increase. Otherwise the construction is the same as previously described, and the same reference numerals are used for corresponding parts.

In the embodiments above described, only the light value or pure light factor is taken into account by the exposure meter. It is within the scope of the invention, however, to include in the electrical circuit a manually operable variable resistance in order to take into account other variables which may be included, such as film speed or filter factor or both. This can be done, for instance, by a variable resistance built into the camera body and adjusted by means of a suitable knob or button on the camera body, or by providing for an adjustable connection rather than a fixed connection between the coupling tongue 58 and the shutter speed setting member 34, so that the coupling tongue 58 can be adjusted circumferentially relative to the speed setting member 34, thereby varying the position of the slider 84 (or 84a, 84b, and 84c) relative to the resistance or resistances, for any given relative position of the parts 34 and 38.

Such a displacement of the tongue 58 relative to the member 34 may also be employed if it is desired, in case of weak illumination, to increase the sensitivity of the photoelectric cell by connecting an additional photoelectric cell in parallel with the first photoelectric cell. This would, of course, cause a different deflection of the pointer or needle 72 than would be the case if only the original or main photoelectric cell were used, and the displacement of the tongue 58 relative to the member 34 could then be employed to compensate for the additional photoelectric cell.

In the preferred construction, the resistance 82 (or the separate resistances 82a, 82b, and 82c) is carried by and movable bodily with one of the two shutter adjusting members, and the slider is carried by and movable bodily with the other. However, it is equally within the scope of the invention to mark the resistance (or resistances) on a stationary part of the shutter housing, cooperating with two separate sliders, one connected to and moving with the speed adjusting member and the other connected to and moving with the diaphragm aperture adjusting member.

Although the preferred form of the invention couples the two adjusting members to each other for conjoint movement, by means of the frictional or resilient coupling 58, 62, yet it is seen that many of the features of the invention are not dependent upon the existence of this coupling, and the same may be dispensed with, the shutter speed setting member and the diaphragm aperture setting member being completely uncoupled from each other and movable independently. Such an omission of the coupling, while not the preferred form, would still result in a highly useful device, the two adjusting members being independently turned as desired by the operator, to any desired set of positions which would bring the needle 72 opposite the correct index point 76 at the time that the picture is to be taken.

The photocell and the galvanometer coil are preferably mounted on the camera body, as shown in Fig. 1. However, the construction would operate on the same principle if these parts were mounted at some suitable point on the shutter housing or casing, rather than on the camera body or housing.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a camera body, a photoelectric cell mounted on said body, a meter pointer movably mounted on said body, an electrical circuit connecting said pointer to said cell to be moved in accordance with variations in current from said cell, an objective shutter housing mounting on said camera body, a shutter speed adjusting ring rotatably mounted on said housing, and a diaphragm aperture adjusting ring also rotatably mounted on said housing, characterized by an electrical resistance element extending arcuately on one of said rings, a series of serrations also extending arcuately on said one of said rings in the vicinity of said resistance element, a resilient coupling arm secured to the other of said adjusting rings and engaging resiliently in any selected one of said serrations to couple said two adjusting rings to each other so that when either one of them is manually turned, the other one will normally turn with it, and a contact slider carried by said coupling arm and making electrical contact with said electrical resistance element at a variable point depending upon the adjusted position of said arm with respect to said serrations, said resistance element and said slider being operatively connected in said electrical circuit so as to vary the resistance of said circuit when said coupling arm is shifted to a different position with respect to said serrations.

2. A photographic camera comprising a camera body, a photoelectric cell mounted on said body, a meter pointer movably mounted on said body, an electrical circuit connecting said pointer to said cell to be moved in accordance with variations in current from said cell, an objective shutter housing mounted on said camera body, a stationary rim extending circumferentially around said shutter housing intermediate the front and rear ends thereof, a shutter speed adjusting ring rotatably mounted on said housing in front of said rim, a diaphragm aperture adjusting ring rotatably mounted on said housing rearwardly of said rim, both of said adjusting rings including axially extending cylindrical wall portions spaced outwardly from a side wall of said shutter housing, a circumferentially extending series of serrations formed internally in said cylindrical wall portion of said aperture adjusting ring, an electrical resistance element mounted in fixed position on said aperture adjusting ring within said cylindrical wall portion thereof, a resilient coupling arm mounted on said speed adjusting ring within said cylindrical wall portion thereof and extending rearwardly past the rear edge of said speed adjusting ring to a position within the cylindrical wall portion of said aperture adjusting ring to engage resiliently in any selected one of said serrations in said aperture adjusting ring to tend to couple the two adjusting rings to each other for conjoint rotation, and a contact slider carried by said coupling arm and making electrical contact with said resistance element at a variable point depending upon the relative orientation of said two adjusting rings with respect to each other, said resistance element and said slider being operatively connected in said electrical circuit so as to vary the resistance of said circuit when said relative orientation of said two adjusting rings is changed.

References Cited in the file of this patent

UNITED STATES PATENTS

| 2,031,321 | Kupperbender | Feb. 18, 1936 |
| 2,209,156 | Fischer | July 23, 1940 |
| 2,246,006 | Riddell | June 17, 1941 |
| 2,592,035 | Jacoby | Apr. 8, 1952 |
| 2,596,328 | Dorsey | May 13, 1952 |
| 2,620,712 | Clifford | Dec. 9, 1952 |

FOREIGN PATENTS

| 442,409 | Great Britain | Feb. 7, 1936 |
| 501,586 | Great Britain | Feb. 23, 1939 |
| 502,908 | Great Britain | Mar. 28, 1939 |
| 523,785 | Belgium | Nov. 14, 1953 |